Patented Sept. 10, 1929.

1,728,052

UNITED STATES PATENT OFFICE.

HENRY GILBERT, OF PHILADELPHIA, PENNSYLVANIA.

ALUMINUM-WELDING ROD.

No Drawing.   Application filed July 30, 1928.  Serial No. 296,425.

My invention relates to a new and useful welding rod, which is particularly adapted for use in connection with the uniting of aluminum products, or for the repair of wares made of aluminum or aluminum alloys, in which aluminum predominates, without the use of any powder or chemical flux.

It is well known that different soldering or welding alloys are necessary for the welding, joining or repair of wares made of different metals, hence a soldering alloy which would be highly efficacious for use in repairing copper wares, might probably be not altogether efficient for tin or aluminum wares and vice versa.

It is further known that in applying soldering or welding material or alloys heretofore known and used, it is generally necessary to apply to the surface to be repaired at the joint or edges to be united a deoxidizing chemical reagent, or powder commonly known as a flux, to remove or deoxidize the uppermost oxidized layer of the metal being united, so that the soldering alloy may run freely with the metal of the article being joined to produce a complete and thorough welding of the parts.

Due to the extensive and increasing use of aluminum or aluminum alloys in the manufacture of tools, instruments, utensils and machinery, an aluminum soldering alloy especially adapted for soldering or welding such wares, is very desirable.

It is the object of my invention to provide a novel soldering or welding alloy which, when used to join aluminum parts will not only effectively unite the parts but will do away with all formations of oxide at the point of application, so that the pure metal of the welding rods runs together with the pure surfaces of the object to be welded, and will, also, when polished and burnished, leave no trace of the joint or break repaired so that the parts are seamlessly joined to give the same appearance as a new article which was never damaged or broken.

A further object of my invention is to produce a novel soldering or welding alloy, which may be directly applied to the surface to be repaired or to the joint without the intervention or previous application of a deoxidizing agent, such as flux or the like, my novel soldering or welding alloy being of such a composition and so prepared that no appreciable oxidization of the parts at the point of application takes place.

To the above ends my invention consists of the novel composition of matter, constituting my novel soldering or welding rod, all as will be hereinafter described and claimed.

For the purpose of illustrating my invention I have herein set forth a formula whereby my novel welding rod may be prepared and have described the method of preparing the same, since I have found in practice such formula and method give satisfactory results, but it is to be understood that the various ingredients included in said formula and the various steps involved in said method may be varied in certain particulars without departing from the spirit or scope of my invention or sacrificing any of its advantages.

In carrying out my invention I employ aluminum as the base of my welding rod, to which I add copper, cadmium and bismuth in certain proportions and in a certain manner, which from experience I have found will give the best results. Thus I first melt about 88.74% of aluminum, to which is added about 2.42% of copper, 8.06% of cadmium and .78% of bismuth which will produce a welding rod possessing all of the properties and advantages above set forth.

In preparing this alloy, I first melt the aluminum thoroughly and then add the proper percentage or amount of copper as above stated. When the copper has melted and a temperature of about 700 degrees F. has been reached, the proper amounts of cadmium and bismuth are added. When the mixture or alloy is thoroughly commingled and melted, it is stirred with an iron rod until a uniform constituency of the alloy is reached, the alloy being prepared and commingled in an earthen crucible or any other similar chemically inactive and heat resisting receptacle. The liquid alloy is then poured into iron moulds or the like to form rods of any desired shape or size.

The cadmium, copper and bismuth added serve to impart a toughness and elasticity to the welding rod produced as well as to reduce the melting point to facilitate the application and use of my novel welding or soldering alloy it being known that pure aluminum melts at about 658 degrees F.

In practice I have found that a welding rod consisting of the elements above set forth commingled and produced in substantially the proportions given gives excellent results for welding, soldering or joining cracks, breaks or joints in wares made from aluminum or its alloys generally employed, and without the use of any powder or chemical flux, and although I have herein described my novel welding rod as consisting of preferred definite proportions of the various elements employed, it is to be understood that said proportions may be varied without departing from the spirit or scope of my invention. Thus, for welding an article made of an aluminum alloy including a relatively large copper constituency, it may be desirable to increase or vary the amount of copper used in my novel composition by proportionally decreasing the amount of aluminum employed. As will be evident this is conducive to uniformity in texture between the welding alloy and the texture of the article to be welded, to produce a seamless joint which when properly polished is invisible and leaves no trace of damage or repair, there being no oxidations or corrosions when my novel device is employed.

I am aware that the invention may be embodied in other specific forms without departing from the spirit or essential attributes thereof, and I therefore desire the present embodiment to be considered in all respects as illustrative and not restrictive, reference being had to the appended claims rather than to the foregoing description to indicate the scope of the invention.

Having thus described my invention what I claim as new and desire to secure by Letters Patent, is:—

1. A welding rod composed of substantially 88.74% of aluminum, 2.42% of copper, 8.06% of cadmium and .78% of bismuth.

2. A welding rod of the character stated composed of approximately 88.74% of aluminum, approximately 2.42% of copper, approximately 8.06% of cadmium, and approximately .78% of bismuth.

HENRY GILBERT.